UNITED STATES PATENT OFFICE.

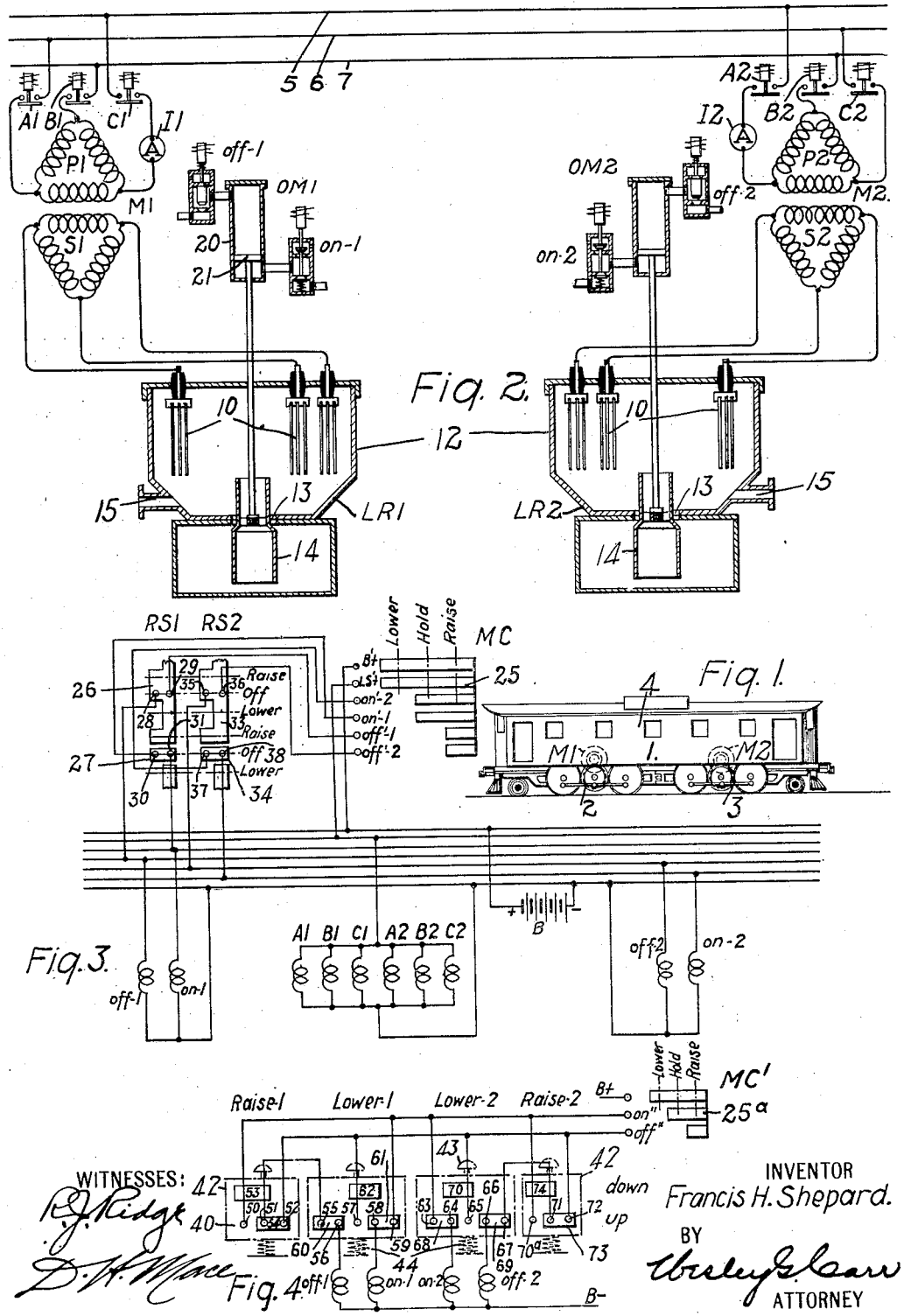

FRANCIS H. SHEPARD, OF NEW ROCHELLE, NEW YORK, ASSIGNOR TO WESTINGHOUSE ELECTRIC AND MANUFACTURING COMPANY, A CORPORATION OF PENNSYLVANIA.

CONTROL SYSTEM.

1,236,775.   Specification of Letters Patent.   Patented Aug. 14, 1917.

Application filed January 6, 1915. Serial No. 784.

*To all whom it may concern:*

Be it known that I, FRANCIS H. SHEPARD, a citizen of the United States, and a resident of New Rochelle, in the county of Westchester and State of New York, have invented a new and useful Improvement in Control Systems, of which the following is a specification.

My invention relates to control systems for dynamo-electric machines that are employed for propelling electric locomotives or other electric vehicles, and it has special reference to the control of polyphase induction motors that are governed by means of a plurality of electro-pneumatically operated liquid rheostats.

One of the objects of my invention is to provide a control system of the above-indicated character by means of which the loads upon the respective driving units, whether they be motor-driven axles, trucks, or half units of an electric locomotive, may be regulated at the will of the operator, or the total load of the locomotive may be divided in any proportion between the several driving units, irrespective of variations in the mechanical construction and electrical characteristics of the several driving motors and their accessory governing apparatus.

Another object of my invention is to provide a system, of the general class referred to, which shall embody relatively few and inexpensive auxiliary control devices, the arrangement and circuit connections of which shall be simple, and which shall be adapted, under the control of an operator, to effect the results hereinbefore mentioned with reliability and positiveness.

In another aspect, it is an object of my invention to provide a system of motor control embodying a plurality of driving units that are governed by electro-pneumatically operated liquid rheostats, and to make provision for permitting the operator to concurrently control the operation of the driving units, and, moreover, to permit of independent control of any of said units.

With present day manufacturing methods, it is practically impossible to commercially construct motors, liquid rheostats and operating mechanisms therefor which shall be identical in construction, electrical characteristics and operating qualities and, therefore, in electrically propelled vehicles and locomotives of the types referred to, there is usually a tendency for certain of the driving units to take a greater portion of the load than is intended. Moreover, differences in the diameters of the driving wheels and other mechanical differences contribute to other inequalities in the division of load between the several driving units. It, therefore, becomes necessary to provide means for correcting for the inherent differences in the operation of the various driving units.

In my co-pending application, Serial No. 852,799, filed July 24, 1914, I have set forth automatic means for attaining the ends in view.

According to my present invention, however, I propose to accomplish the same general results, but to do so by means of a simplified system which is entirely under the control of the operator.

In describing the circuit connections and operation of the sytem of control of my invention, I shall, for the sake of simplicity, set forth a system of the multiple-unit type for governing the operation of a pair of polyphase induction motors through the agency of separate electrically controlled liquid rheostats, the several motors being mounted upon the respective driving trucks of a single locomotive unit. It should be understood, however, that the particular location of the motors is unessential, and that my invention is equally applicable to locomotives having trucks severally provided with a pair of driving motors or to a locomotive comprising a pair of half units.

In the accompanying drawing, Figure 1 is a view, in side elevation, of a locomotive having driving motors that may be conveniently controlled by a system of control embodying my invention; Fig. 2 is a diagrammatic view of the main control apparatus and main circuit connections of a control system arranged in accordance with my invention; Fig. 3 is a diagrammatic view of the auxiliary control circuits and apparatus for governing the operation of the main control devices shown in Fig. 2; and Fig. 4 is a simplified diagrammatic view of a modified system of control circuits and apparatus for governing the operation of a portion of the main circuit devices shown in Fig. 2.

Referring to the drawing, a locomotive 1 comprises a plurality of driving trucks 2 and 3 that are severally provided with polyphase induction driving motors M1 and M2 and a cab 4 that is supported upon the trucks 2 and 3.

The motors M1 and M2 embody primary windings P1 and P2 and secondary windings S1 and S2, respectively, the primary windings being adapted to receive energy from a plurality of supply-circuit conductors 5, 6 and 7 through a plurality of line switches A1, B1 and C1 and A2, B2 and C2. In circuit with one of the line switches of the respective motors are indicating instruments $I_1$ and $I_2$, which may conveniently constitute ammeters of any well-known type or may comprise any form of indicating device by means of which the relative loads upon the respective motors M1 and M2 may be determined. The secondary windings S1 and S2 of the motors M1 and M2 are respectively connected to electrodes 10 of a plurality of liquid rheostats LR1 and LR2.

The rheostats LR1 and LR2 are of like construction, although their specific structural details form no material part of my present invention, and each embodies a tank 12 having a bottom discharge opening 13 in which a combined discharge and regulating valve 14 is disposed for the purpose of closing the discharge opening and for regulating the level of the electrolyte which is continuously supplied to the rheostat through an inlet opening 15.

The several discharge and regulating valves 14 are tubular in form and are respectively mechanically associated with electrically governed operating mechanisms OM1 and OM2. Since the contruction and operation of these mechanisms are similar, only one of them will be described. The mechanism OM1 comprises a cylinder 20, a movable piston 21 contained therein, and a plurality of electrically operated valves "off—1" and "on—1" that are adapted to govern the admission and release of operating fluid to and from the cylinder 20. The valve "off—1," when deënergized, is adapted to admit operating fluid from a source (not shown) to the upper end of cylinder 20 and to prevent any communication with the atmosphere, while the valve "on—1," when deënergized, cuts off the supply of operating fluid to the lower end of the cylinder 20 and establishes a communication to the atmosphere. Under these conditions, operating fluid is admitted above the piston 21 and exhausted beneath it, and, hence, said piston and its associated valve 14 are biased to their lowest positions in which the discharge opening 13 is partially opened to permit the escape of the continuously supplied electrolyte.

Reference may now be had to Fig. 3 in which is shown a master controller MC comprising a movable conducting segment 25 and a plurality of stationary contact terminals B'+, LS'+, on'—2, on'—1, off'—1 and off'—2 which are adapted for coöperative engagement upon the position-indicating lines "lower," "hold" and "raise," for the purpose of concurrently governing the operation of the mechanisms OM1 and OM2.

In addition, a plurality of rheostat switches RS1 and RS2 are provided that are respectively adapted to independently control the operation of the mechanisms OM1 and OM2 of the respective rheostats LR1 and LR2. The rheostat switch RS1 comprises a plurality of movable conducting segments 26 and 27 that are adapted to coöperatively engage a plurality of stationary contact terminals 28, 29, 30 and 31 upon the position-indicating lines "raise," "off" and "lower." The rheostat switch RS2 is of similar construction and embodies movable conducting segments 33 and 34 and a plurality of stationary contact terminals 35, 36, 37 and 38.

In setting forth the operation of the system and in tracing the circuits thereof, only the main elements of the system will be recited, and the enumeration of the various electrical conductors will be omitted for the sake of clearness, it being believed that a clear understanding of the invention may be obtained without the necessity of completely tracing all of the circuit connections.

The master controller MC is first moved into its position "raise" in which a circuit is completed from the positive terminal of a battery B, or other suitable source of energy, which includes contact terminal B'+ and conducting segment 25 where the circuit divides, one branch including terminal on'—2, terminal 37, conducting segment 34, terminal 38, and thence through the energizing coil of the magnet valve "on—2" to the negative terminal of the battery B; another branch includes terminal on''—1, terminals 30 and 31—that are bridged by the conducting segment 27 of the rheostat switch RS1— and thence through energizing coil of the magnet valve "on—1" to the battery; another branch is completed through terminal off'—1 and terminals 28 and 29—which are bridged by the conducting segment 26 of the rheostat switch RS1—, and thence through the energizing coil of valve "off—1" to the battery; and still another branch includes terminal off'—2, terminal 36, conducting segment 33, terminal 35 and energizing coil of magnet valve "off—2" to the battery.

Having completed the circuits just recited, all of the magnet valves "off—1", "on—1", "off—2" and "on—2" are energized and actuated into their opposite positions whereby the operating fluid contained within the upper ends of both cylinders 20 is released, while a supply of operating fluid is admitted beneath the pistons 21. The unbalanced pressure conditions thus effected cause the pistons 21, and hence the respective discharge and regulating valves 14, to be raised in position, thereby closing the several discharge openings 13 and permitting the inflowing electrolyte to rise in both of the rheostats LR1 and LR2 to a level corresponding to the upper ends of said valves.

As the electrolyte level within the rheostats LR1 and LR2 becomes gradually raised, the resistance in the secondary circuits of the motors M1 and M2 is reduced, and, hence, these motors are correspondingly accelerated in speed. Obviously, the total load is carried by motors M1 and M2, and, in the event that the operating characteristics of the motors and their actuating mechanisms are identical, the load is proportionately divided between them. However, such conditions are rarely secured with commercial apparatus and, for purposes of explanation, it will, therefore, be assumed that, by reason of certain differences, the specific nature of which is immaterial, the motor M1 has a tendency to carry more than its intended share of the load, as will be indicated to the motorman or operator by the comparative indications of the devices $I_1$ and $I_2$.

In order to re-distribute the load upon the motors M1 and M2, the operator manipulates the rheostat switch RS2 by moving it into its "lower" position. Thus, the circuit of the magnet valve "off—2" is interrupted by the disengagement of contact terminal 35 with the conducting segment 33, while that of valve magnet "on—2" is maintained by reason of the engagement of contact terminals 37 and 38 with the conducting segment 33, which bridges said terminals. Thus, the valve "off—2" is deënergized to admit operating fluid above the piston 21 of the operating mechanism OM2, while the supply of operating fluid beneath said piston is maintained by reason of the continuous energization of the valve "on—2". Balanced pressures, therefore, act upon the piston 21 of the mechanism OM2 and, therefore, further movements of said piston and its associated regulating valve 14 are prevented.

The level of the electrolyte within the rheostat LR2, therefore, is held constant, while that in the rheostat LR1 continues to rise, whereby the motor M1 gradually increases its load and the motor M2 operates under constant load conditions until the desired balance of load is obtained, as shown by the indicating means $I_1$ and $I_2$. As soon as the desired load conditions are secured, the rheostat switch RS2 is moved back to its "off" position and subsequently, the regulating valves 14 of both rheostats LR1 and LR2 are again raised concurrently to effect the acceleration of both motors M1 and M2.

Obviously, if it is found that the motor M1 is taking more than its share of the load, the rheostat switch RS1 may be moved to its position marked "Lower," whereby further upward movement of the valve 14 of the rheostat LR1 is discontinued until balanced loads are secured, when the rheostat switch RS1 is returned to its "off" position, and concurrent operation of the rheostats LR1 and LR2 is resumed. By reason of the simplicity and similarity of the circuit connections established through the agency of a switch RS1 to those hereinbefore traced in connection with the manipulation of switch RS2, it is deemed unnecessary to describe the circuits and operation.

Assuming the master controller MC to occupy its "raise" position, and concurrent upward movements of the respective valves 14 to be effected, the motor speed may be held constant at any time by moving the master controller MC to its "hold" position in which the magnet valves "off—1" and "off—2" are deënergized by reason of the disengagement of the contact terminals off'—1 and off'—2 from the conducting segment 25. The deënergization of the said valves permits them to return to their initial positions to admit operating fluid to the upper ends of the cylinders 20, thereby effecting a balance of pressures acting upon the movable pistons 21 and arresting further movements thereof.

If, under these conditions, the indicating means $I_1$ and $I_2$ show that the motor M2 is overloaded, the rheostat switch RS2 is moved to its "lower" position, whereby the disengagement of contact terminals 37 and 38 from the bridging contact member 34 is effected, thus, interrupting the energizing circuit of the coil of magnet valve "on—2." The valve "on—2" therefore returns to its initial position to permit the escape of operating fluid, whence, the unbalanced pressures acting upon the piston 21 cause said piston and its valve 14 to be forced downwardly to lower the level of the electrolyte within the rheostat LR2 and, hence, to reduce the load upon the motor M2.

Without further description, it will be understood that, in lieu of decreasing the load upon the motor M2, a balance of loads may be secured by causing the motor M1 to carry a larger portion thereof by moving the rheostat switch RS1 to its "raise" position and thereby energizing the coil of magnet valve "off—1" to effect unbalanced pressure conditions that act upon the piston 21 of the operating mechanism OM1, and raise the associated regulating valve 14 until the desired load conditions are obtained. The switch RS1 is then returned to its "off" position, and the level of the electrolyte within both of the rheostats LR1 and LR2 is held constant.

The load upon the motors M1 and M2 may be concurrently decreased by moving the master controller MC to its "lower" position, thereby also effecting the disengagement of stationary contact terminals on'—1 and on'—2 from the conducting segment 25. In this position, all of the magnet valves "on—1," "on—2," "off—1" and "off—2" are deënergized, and the unbalanced pressures within the cylinders 20 are such as to effect the simultaneous downward movements of the respective pistons 21 and regulating valves 14. The electrolyte levels within the rheostats LR1 and LR2 are thus concurrently lowered and, hence, the speed and load of both motors M1 and M2 are decreased.

In the event that one of the motors becomes overloaded during this operation, the operator may establish balanced load conditions between them by suitable manipulation of the one or the other of the rheostat switches RS1 and RS2, as will be understood.

From the foregoing description, it is evident that the operation of the several mechanisms OM1 and OM2, and, hence, of the respective motors M1 and M2 may be governed concurrently by the operator through the agency of the master control MC, while the rheostat switches RS1 and RS2 permit of independent control of either motor in order to correct for unbalanced load conditions.

Reference may now be had to Fig. 4, which discloses an auxiliary control system of a modified type for permitting the independent control of each of the several magnet valves "off—1," "on—1, "off—2," "on—2" by means of separate manually operated switches marked "Raise—1," "Lower—1," "Lower—2" and "Raise—2," which may conveniently take the form of push-button devices.

Each of the switches just referred to comprises a set 40 of stationary contact terminals and a plurality of movable conducting segments that are mounted upon a movable carrier 42 and are adapted for coöperative engagement with the set of terminals 40 upon the position-indicating lines "down" and "up." The carrier 42 is provided with an actuating member or push-button 43 and is maintained in its "up" position by means of a spring 44.

The push-button switch "raise—1" comprises stationary contact terminals 50, 51 and 52 and movable conducting segments 53 and 54; the switch "lower—1" comprises stationary contact terminals 55, 56, 57, 58 and 59 and movable conducting segments 60, 61, and 62; the switch "lower—2" embodies stationary terminals 63, 64, 65, 66 and 67 and conducting segments 68, 69 and 70; and the switch "raise—2" is provided with stationary terminals 70ª, 71 and 72 and conducting segments 73 and 74.

If the apparatus and circuit connections be assumed to occupy the positions shown in the figure, the operation of the system is as follows:

In order to accelerate the motors M1 and M2, the master controller MC' is moved to its "raise" position, thereby establishing a circuit from contact terminal B+ which includes movable conducting segment 25ª, terminal "on," and thence through a divided circuit, one branch of which includes terminals 63 and 64 that are bridged by a conducting segment 68 of the switch "lower—2" and the energizing coil of magnet valve "on—2" to conductor B—, and another branch including terminals 58 and 59 that are bridged by conducting segment 61 of the switch "lower—1" and energizing coil of valve "on—1" to conductor B—. Another circuit is established from conducting segment 25ª through terminal "off" and thence through a divided circuit, one branch of which includes terminals 71 and 72 and conducting segment 73 of switch "raise—2," terminals 66 and 67 and conducting segment 69 of switch "lower—2" and energizing coil of magnet valve "off—2" to conductor B—, and another branch including terminals 51 and 52 and conducting segment 54 of switch "raise—1" and terminals 55 and 56 and conducting segment 60 of switch "lower—1" and energizing coil of magnet valve "off—1" to the B— conductor.

Upon the completion of the circuits just recited, all of the magnet valves "off—1," "on—1," "off—2" and "on—2" are energized and actuated, whence unbalanced pressures are effected within the several operating cylinders 20 that serve to raise the respective pistons 21 and their associated regulating valves 14 of the rheostats LR1 and LR2.

Under these conditions, the motors M1 and M2 are started into operation and are concurrently brought up to speed. If, for any reason whatsoever, the motor M2 has a tendency to carry a greater portion of the load as shown by the indicating devices $I_1$ and $I_2$, the switch "lower—2" is actuated to its "down" position, thus breaking the circuit of the energizing coil of the valve "off—2" by the disengagement of the conducting segment 69 from the terminals 66 and 67, while maintaining a circuit through the coil of valve "on—2" by means of terminals 64 and 65 which are bridged by the conducting segment 70 in the "down" position of said switch. Upon the deënergization of valve "off—2," it is permitted to return to its initial position to admit operating fluid to the upper end of the associated cylinder and to arrest further movements of the piston 21 and regulating valve 14 of rheostat LR2. Inasmuch as the operating mechanism OM1 continues to raise its associated valve 14, the motor M1 gradually increases its load until the desired division thereof is obtained, as shown by the indicating means I₁ and I₂. The switch "lower—2" is then released and permitted to return to its "up" position to reëstablish its initial circuit connections through the coils of the valves "on—2" and "off—2." The concurrent operation of the mechanisms OM1 and OM2, therefore, is resumed.

In case the load upon the motor M1 becomes excessive, it is within the power of the operator to reëstablish balanced load conditions merely by actuating switch "lower—1" and thereby deënergizing the coil of magnet valve "off—1" while maintaining the energization of magnet coil "on—1" in a manner similar to that just described. Thus, further upward movements of the operating mechanism OM1 are prevented, thereby permitting the motor M² to assume a greater portion of the load until the desired division of load is secured, whence, the switch "lower—1" is released and concurrent operation resumed.

No further detail description of the circuit connections and operation of the system will be given, it being deemed sufficient merely to state that concurrent operation of both rheostats LR1 and LR2 may be secured by moving the master controller to any of its operative positions "raise," "hold" and "lower," while independent control of the operation of any of the magnet valves "off—1," "on—1," "off—2" and "on—2" may be effected by suitable manipulations of the respective switches "raise—1," "lower—1," "lower—2" and "raise—2."

Although I have shown and described my invention as embodying a specific arrangement of circuit connections and apparatus and mode of operation, it will be understood that my invention is not restricted in any way to that which is hereinbefore set forth, and may be embodied in a system having materially different connections and structural features without departing from the spirit and scope of my invention. I desire, therefore, that only such limitations shall be imposed as are indicated in the appended claims.

I claim as my invention:

1. The combination with a plurality of resistance-varying devices, and means for severally actuating said devices to vary the resistance value of the governed circuits, of means for concurrently controlling the operation of said actuating means, and means for independently governing the operation thereof.

2. The combination with a plurality of fluid-pressure-actuated devices and electromagnetic means for severally governing the operation thereof, of electrical remote-control means for concurrently controlling the operation of said electro-magnetic governing means to effect corresponding movements of said fluid-pressure devices, and other electrical remote-control means for independently controlling the operation of any of said electro-magnetic governing means whereby non-corresponding movements of said fluid-pressure devices are effected.

3. The combination with a plurality of liquid rheostats, and means for severally actuating said rheostats to fix the level of the electrolyte therein, of means for concurrently controlling the operation of said actuating means, and means for severally and independently governing the operation thereof.

4. The combination with a plurality of liquid rheostats, and means for severally regulating the levels of the electrolyte therein, of common means for concurrently controlling the actuation of said regulating means, and a plurality of independent means severally adapted to control the actuation of the respective regulating means.

5. The combination with a plurality of liquid rheostats, and means for severally regulating the levels of the electrolyte therein, of common electrical means for effecting concurrent movements of the respective regulating means, and a plurality of auxiliary control means in circuit with said common control means for severally and independently governing the movements of the respective regulating means.

6. In a control system, the combination with a plurality of liquid rheostats and fluid-pressure-actuated means associated with each rheostat for regulating the level of the electrolyte therein, of means for concurrently controlling the operation of said fluid-pressure means, and means for independently governing the operation of the respective fluid-pressure means.

7. In a control system, the combination with a plurality of liquid rheostats and fluid-pressure-actuated means associated with each rheostat for regulating the level of the electrolyte therein, of electro-magnetic means for governing the operation of said fluid-pressure means, remote-control means for concurrently governing the operation of said electro-magnetic means to effect corresponding movements of said fluid-actuated means, and auxiliary remote-control means for independently governing the operation of the respective electromagnetic means to effect relatively different movements of said fluid-pressure means.

8. In a system of control, the combination with a plurality of liquid rheostats severally having movable valves for regulating the level of the electrolyte therein, and electrically controlled fluid-pressure means for severally actuating said valves, of a master controller and circuit connections for concurrently governing the operation of said fluid-pressure means, and independent means for severally controlling the operation of said fluid-pressure means.

9. In a system of control, the combination with a plurality of liquid rheostats severally having movable valves for regulating the level of the electrolyte therein, and electrically controlled fluid-pressure means for severally actuating said valves, of electrical means for effecting concurrent operations of said fluid-pressure means, and switching means in circuit with said electrical means for effecting independent operations of said fluid-pressure means.

10. In a system of control, the combination with a plurality of electric motors, a plurality of liquid rheostats severally associated therewith and having movable valves for regulating the level of the electrolyte therein, and electrically controlled means for raising and lowering said valves for governing the load upon the respective rheostats, of remote-control electrical means for concurrently governing the operation of said electrically controlled means, and a plurality of independently operated means for separately controlling the operation of said electrically controlled means and causing either of said valves to be raised, lowered or held at rest at the will of the operator.

11. The combination with a plurality of liquid rheostats severally having movable valves for regulating the level of the electrolyte therein, fluid-pressure devices respectively adapted to actuate said movable valves, and a plurality of electrically controlled valves associated with each of said devices, of a master controller and circuit connections for concurrently governing said valves to cause the fluid-pressure devices to effect corresponding movements of their associated regulating valves, and a plurality of auxiliary switches severally in circuit with the valves of the respective fluid-pressure devices for independently governing the operation of the respective rheostats.

12. The combination with a plurality of liquid rheostats severally having movable valves for regulating the level of the electrolyte therein, fluid-pressure devices respectively adapted to actuate said movable valves, and a plurality of electrically controlled valves associated with each of said devices, of a master controller for governing the energization of all of said electrically controlled valves and for effecting concurrent operation of the several fluid-pressure devices, and a plurality of auxiliary switches severally adapted to independently govern the energization of different valves.

13. The combination with a plurality of liquid rheostats severally having movable valves for regulating the level of the electrolyte therein, fluid-pressure devices respectively adapted to actuate said movable valves, and a plurality of electrically controlled valves associated with each of said devices, of remote-control means embodying a master switch for concurrently governing the energization of corresponding electrically controlled valves of each rheostat and a plurality of switching devices for severally governing the energization of both of the valves associated with the respective fluid-pressure devices, said switching devices being severally interlocked with the energizing circuits of both valves to be governed.

14. In a system of control, the combination with a plurality of electric motors, power-actuated resistance-varying means for governing the operation thereof, and means embodying a master controller and circuit connections for concurrently effecting the operation of all said resistance-varying means, and a plurality of auxiliary master switches coöperating with certain of said circuit connections for independently effecting the operation of said resistance-varying means and modifying the load conditions upon the respective motors.

15. In a system of control, the combination with a plurality of liquid rheostats severally having movable valves for regulating the level of the electrolyte therein, and electrically controlled fluid-pressure means for severally actuating said valves, of a master switch and circuit connections for effecting multiple control of the respective fluid-pressure means, and a plurality of auxiliary switches associated with different circuit connections for independently modifying the operation of the fluid-pressure means.

16. In a system of control, the combination with a plurality of liquid rheostats severally having movable valves for regulating the level of the electrolyte therein, and electrically controlled fluid-pressure means for severally actuating said valves, of a master switch and circuit connections for concurrently governing the operation of said fluid-pressure means, and a plurality of auxiliary switches in circuit with certain of said circuit connections for severally and independently changing the circuit connections of the respective fluid-pressure means, whereby the operation of any of said fluid-pressure means may be modified at will.

17. In a system of control, the combination with a plurality of electric motors, of a plurality of resistance-varying devices associated therewith, means for concurrently governing the operation of said devices, and means for independently controlling the respective devices to effect changes in the distribution of load between the motors.

18. In a system of control, the combination with a plurality of electric motors, of a plurality of variable translating devices associated therewith, fluid-operated actuating means for varying said devices, common means for governing the operation of said actuating means, and means for independently controlling the respective actuating means to effect changes in the distribution of load between the motors.

In testimony whereof, I have hereunto subscribed my name this 29th day of December, 1914.

FRANCIS H. SHEPARD.

Witnesses:
WM. H. CAPEL,
C. WESLEY POMEROY.